Figure 1:
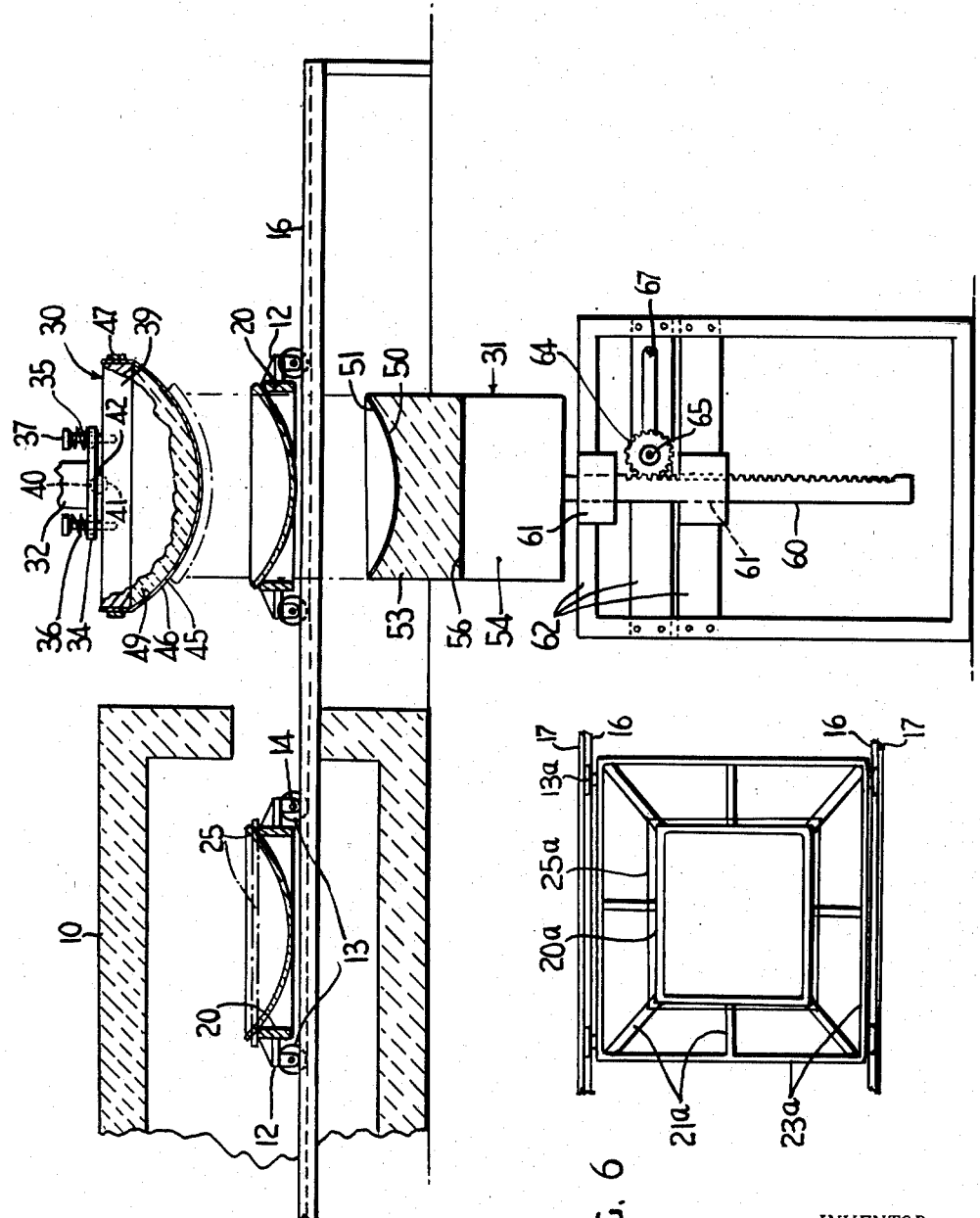

Oct. 9, 1951        L. V. BLACK        2,570,309

METHOD AND APPARATUS FOR BENDING GLASS

Filed Sept. 13, 1950        2 Sheets-Sheet 2

INVENTOR.
LLOYD V. BLACK
BY Olen E. Bee
ATTORNEY

Patented Oct. 9, 1951

2,570,309

UNITED STATES PATENT OFFICE 2,570,309

METHOD AND APPARATUS FOR BENDING GLASS

Lloyd V. Black, Tarentum, Pa., assignor to Pittsburgh Plate Glass Company, Allegheny County, Pa., a corporation of Pennsylvania Application September 13, 1950, Serial No. 184,628

10 Claims. (Cl. 49—7)

This invention relates to the bending or shaping of sheet glass and it has particular relation to improved methods and apparatus for producing bent sheet glass having compound surface curvatures and suitable for use as lenses, reflectors, mirrors and other articles having precision surfaces.

One object of the invention is to provide an improved apparatus capable of handling heat softened sheet glass and molding it to predetermined concavo-convex form.

Another object of the invention is to provide an arrangement of sheet glass handling apparatus capable of novel modes of operation for producing lens-like articles directly from finished sheet glass without marring the glass surfaces.

Another object of the invention is to provide an improved method of bending or molding sheet glass into spheroidal or ellipsoidal lens form without marring the glass surfaces.

Another object of the invention is to provide an improved method of treating sheet glass so as to produce compound curvatures in concavo-convex articles.

Heretofore in the art of bending or molding sheet glass between nesting molds having complemental convex and concave molding faces, especially in the formation of compound bends of spheroidal or ellipsoidal configuration, difficulty has been experienced in maintaining original smoothness of the glass surface. In certain types of pressure molds of this type, the surfaces of the glass are burned or otherwise marred under the conditions of heat and pressure required for this operation. For certain purposes, disadvantages of this kind can be obviated by the use of so-called skeleton molds wherein the heat softened glass is permitted to sag while it is supported along its marginal portions and the glass is cooled at the proper time to insure the desired depth of the bend. It is to be noted that free sagging of the glass in this manner produces at least appreciable variation in surface contour of the glass articles, as well as surfaces which may not be sufficiently true for practical purposes when the glass is to be used for lenses, mirrors or other articles wherein precision smoothness is required.

Where complemental convex and concave molding surfaces are employed to shape sheet glass by methods previously employed, the heated glass ordinarily is pressed between the mold sections, either while the glass is suspended or while it is supported upon one of the mold sections. As the mold sections approach each other, the nose or apex of the convex surface first engages the glass and bends it toward the concave mold upon which the edges of the glass are supported. Under such conditions, there is such bulging of the glass that it is excessively distorted before it settles or is pressed finally between the complemental mold surfaces.

One of the features of this invention resides in an apparatus adapted to support the glass in such position that it can be softened and can sag substantially to, or closely approaching, the final shape to which it is to be molded. Then an upwardly movable mold section lifts the softened glass from its original support and carries it upwardly against the convex upper mold section. At the time the glass reaches the upper concave mold section it is ready to fit very nearly the contour of the concave mold. As pressure is applied to finally shape the glass between the mold sections there is very little leeway for any glass distortion or accumulation of air between the glass and the concave section. Hence the molding operation is quickly and efficiently completed with the glass surfaces unmarred.

The mold sections can be composed of rigid metallic or refractory material. When metal mold sections are employed, it is desirable to line the molding surfaces with fiber glass fabric which has been found to obviate burns or marred areas which might otherwise occur on the glass as a result of surface contact of the glass with the mold under the required conditions of heat and pressure.

It has also been found that molding sections composed of graphite will obviate such burned or marred areas which are otherwise ordinarily encountered in the use of metallic molds for shaping glass.

Figure 2:
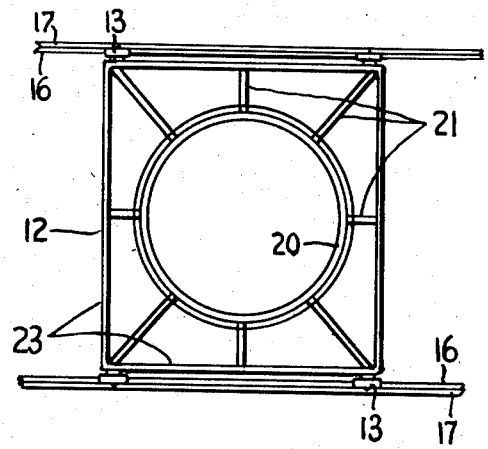
Figure 3:
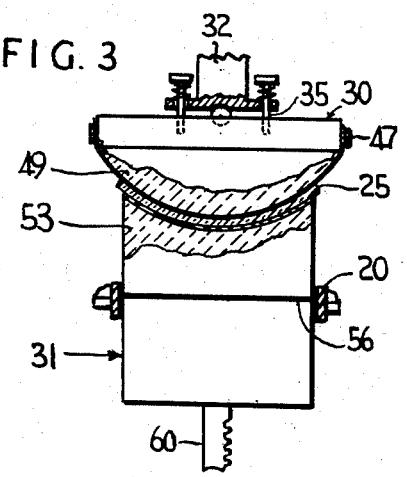
Figure 5:
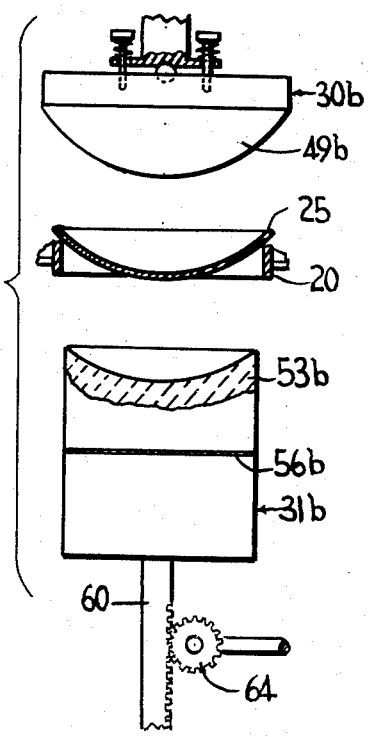
Figure 4:
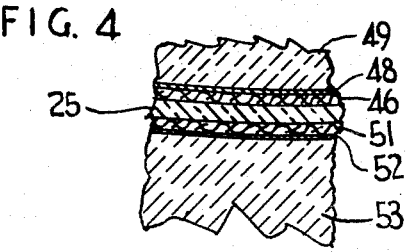

In the drawing,

Fig. 1 is a fragmentary diagrammatic view partially in vertical section and partially in side elevation of an apparatus for molding or bending sheet glass; Fig. 2 is a fragmentary plan of a frame carriage and track for supporting sheet glass in connection with molding and bending operations; Fig. 3 is a fragmentary vertical section of complemental mold sections in nested relation; Fig. 4 is a fragmentary vertical section on a larger scale of portions of nesting mold sections and including fabric lining therefor; Fig. 5 is a fragmentary diagrammatic vertical section similar to that shown in Fig. 1 and including alternate forms of mold sections; and Fig. 6 is a fragmentary diagrammatic plan similar to Fig. 2 and illustrating an alternate form of glass supporting frame.

In practicing the invention, a furnace 10 for heating glass receives a frame carriage 12 which travels on wheels 13 rotatably secured thereto, as indicated at 14. Each frame carriage is movable along a predetermined horizontal path defined by horizontal rails 16 disposed in the furnace and projecting outwardly therefrom a sufficient distance to accommodate other operations after the carriage leaves the furnace. The rails are formed with upright flanges 17 designed for the purpose of maintaining the wheels properly aligned, and hence maintaining the carriages always in the same path of movement.

Each carriage 12 is composed of a central or inner metal frame 20 from which radiate a series of supporting braces 21. These braces are integral with or are rigidly secured at their inner ends to the inner frame 20 by welding or other convenient connecting means. The outer ends of the braces are likewise integral with or rigidly secured by welding or other means to surrounding frame members 23 upon which the wheels 13 are mounted. It is to be noted that the inner frame 20 is free from any internal bracing members. It is also to be noted that the inner frame 20 can be in the form of an annulus, or in the form of a polygonal frame 20a mounted in the same general type of surrounding structure as that designed to support the inner annulus 20. Similar reference characters including appropriate exponents are employed in Fig. 6 to designate the elements corresponding to the elements of the carriage shown in Fig. 2.

A sheet of glass 25 to be bent or molded is placed upon the inner frame 20 so that the marginal portions of the glass rest upon the frame and the central portion is free of any support. After heating the glass to softening temperature in the furnace 10, such glass begins to sag as shown in somewhat diagrammatic form in Fig. 1. While the glass is still in softened condition, the carriage 12 is moved horizontally on the rails 16 until the inner frame 20 registers vertically with upper and lower mold sections 30 and 31.

The upper mold section is carried upon a rigid stationary support 32, the lower end of which is provided with a flange 34 having bolts 35 loosely and slidably mounted therein. Coil springs 36 suround the bolts and are confined under compression between the heads 37 of the bolts and the upper side of the flange 34. These bolts are screw-threaded into the upper side of a rigid backing 39 of the upper section. Registering sockets 40 and 41 are formed in the lower side of the support 32 and the upper side of the mold section, respectively, to receive a metal ball bearing 42. The upper section 30 is thus mounted so as to be universaly tiltable about the ball bearing while normally it is yieldably maintained in coaxial vertical alignment with the lower section 31.

A lower convex surface 45 constitutes the molding portion of the upper section 30 and can be spheroidal or ellipsoidal in contour. That is, this mold has a compound convex surface of desired configuration which is not limited to a specific section of a sphere.

The lower portion 49 of the upper section 30 defining the convex molding surface 45 is composed of suitable rigid material and can be faced with a layer of fiber glass fabric 46 secured thereto by means of a band 47 surrounding the section and overlapping the edges of the fabric. The body portion 49 upon which the molding surface 45 is designed can be in the form of a suitable rigid metal structure, or a refractory material, such as hard graphite composition. The fabric 46 can be further secured, as indicated at 48, to the surface 45 by means of a suitable adhesive, such as celulose acetate.

The lower section 31 is provided with a concave spheroidal or ellipsoidal molding surface 50 complemental with respect to the convex surface 45 and is lined with a layer of fiber glass fabric 51, which can be cemented, as indicated at 52, in the same manner as the fabric 46 is cemented to the upper mold surface 45. The molding body 53 defining the molding surface 50 can be in the form of a suitable rigid metal structure or refractory material, such as hard graphite composition.

With respect to Fig. 5, it is to be noted that the upper and lower mold sections 30b and 31b are designed for use of molding bodies 49b and 53b of graphite composition engageable directly with the glass surface in the molding operation. It has been found that satisfactory results can be secured by using the graphite molding surfaces without covering them with fiber glass fabric, although under certain conditions fiber glass linings are preferable. The application and operation of the mold sections shown in Fig. 5 are substantially the same as those described with respect to Fig. 1.

In both the upper and lower molding sections, the refractory bodies 49 and 53 are secured, as indicated at 56 by means of suitable cementing thereof to the backing supports 39 and 54 respectively.

While the upper molding section 30 is substantially stationary, the lower section 31 is connected to an upright vertically movable rack bar 60 rigidly secured at one end to the lower side of the backing support 54. Suitable guides 61 carried by a supporting frame 62 insure proper vertical movement of the bar 60. A pinion 64 having an axial support 65 carrying such pinion rotatably in the frame 62 is provided with a crank arm 67 which is rigidly mounted with respect to the axial support 65 and pinion 64. The pinion 64 engages the rack bar and in response to rotation thereof the bar carrying the lower molding section 31 is movable vertically.

After the carriage 12 has been transported outwardly upon the rails 16 until the inner frame 20 registers with the vertically movable section 31, the latter is then raised by operation of the pinion and passes through the inner frame 20 so as to contact the glass sheet 25 and move it upwardly against the lower convex fiber glass covered surface 45 of the upper section. The glass is thus molded under pressure to the contour defined by the upper and lower molding surfaces 45 and 50.

Since the mold sections are outside the furnace 10, they are materially cooler than the furnace atmosphere from which the glass emerges. After the glass is confined and molded between the nesting mold sections, the glass is cooled sufficiently to lower the temperature below the softening point of the glass. After the glass has been properly molded with precision to the contour of the mold sections and cooled sufficiently to become set, these sections are separated. In this operation the glass remains upon the lower mold section 31 until the latter passes downwardly through the inner frame 20 of the carriage and the glass is automatically deposited in molded form upon the frame 20. The carriage can then be moved outwardly to an unloading area upon the rails 16 or into a lehr for further annealing if this operation is desired. Succeeding carriages carrying glass to be molded in the same manner as that described are then brought forward from the furnace.

Although principal features of the invention have been shown and described in detail, it will be apparent to those skilled in the art that the invention is not so limited but that various changes can be made therein without departing from the spirit or scope of the invention as exemplified in the appended claims.

I claim:

1. In an apparatus for shaping sheet glass to predetermined curvatures, an upper convex mold section, means for supporting the upper mold section, a lower concave mold section movable vertically into and out of nesting relation to the upper mold section, a glass supporting frame section disposed in registering relation to the lower mold section and having an opening across which the sheet glass is supported, and means for moving the lower mold section upwardly through the opening into contact with the glass and carrying said glass upwardly into molding relation to the upper mold section.

2. In an apparatus for shaping sheet glass to compound curvatures, an upper mold section, means for supporting the upper mold section, a lower mold section movable vertically into and out of nesting relation to the upper mold section, a glass supporting frame section, means for movably supporting said frame into and out of registering relation to said mold sections, said frame section having an opening across which the sheet glass is supported, and means for moving the lower mold section upwardly through said opening into contact with the glass supported across it and carrying said glass upwardly into molding relation to the upper mold section.

3. In an apparatus for shaping sheet glass to predetermined curvatures, an upper mold section including a rigid graphite block having a substantially spheroidal convex mold face therein, means for supporting the upper mold section, a lower mold section movable vertically into and out of nesting relation to the upper mold section, said lower mold section including a rigid graphite block having a substantially spheroidal concave mold face therein complemental to the upper convex mold face, a glass supporting frame section disposable above and in registering relation to the lower mold section and having an opening across which the sheet glass is supported, and means for moving the lower mold section upwardly through the opening into contact with the glass and carrying said glass upwardly into molding relation to the upper mold section.

4. In an apparatus for shaping sheet glass to predetermined curvatures, an upper mold section including a rigid block having a substantially spheroidal convex mold face therein, means for supporting the upper mold section, a lower mold section movable vertically into and out of nesting relation to the upper mold section, said lower mold section including a rigid block having a substantially spheroidal concave mold face therein complemental to the upper convex mold face, a layer of fiber glass material secured upon and covering one of said concave mold faces, a glass supporting frame section disposable above and in registering relation to the lower mold section and having an opening across which the sheet glass is supported, and means for moving the lower mold section upwardly through the opening into contact with the glass and carrying said glass upwardly into molding relation to the upper mold section.

5. In an apparatus for shaping sheet glass to predetermined curvatures, an upper mold section composed of a rigid block and having a substantially spheroidal convex mold face, a layer of fiber glass material secured upon and covering said convex face, means for supporting the upper mold section, a lower mold section movable vertically into and out of nesting relation to the upper mold section, said lower mold section being composed of a rigid block, said lower mold section having a substantially spheroidal concave mold face complemental to the upper convex mold face, a layer of fiber glass material secured upon and covering said concave mold face, a glass supporting frame section disposable above and in registering relation to the lower mold section and having an opening across which the sheet glass is supported, and means for moving the lower mold section upwardly through the opening into contact with the glass and carrying said glass upwardly into molding relation to the upper mold section.

6. A method of shaping heated sheet glass to predetermined compound curvatures, the steps which comprise supporting heat softened sheet glass substantially horizontally about marginal portions leaving the inner portions between the marginal portions substantially free, moving a lower concave molding surface upwardly into contact with the lower side of the sheet glass and at a location inwardly of the edges thereof, and further moving the glass upwardly on the concave surface away from the marginal supports into molding relation under pressure against a substantially stationary upper convex molding surface.

7. A method of shaping heated sheet glass to predetermined compound curvatures between upper and lower convex and concave molding surfaces, the steps which comprise supporting heated sheet glass substantially horizontally about marginal portions thereof leaving the inner portions between the marginal portions substantially free, moving the lower molding surface upwardly into contact with the lower side of the sheet glass at a location inwardly of the marginal portions thereof, and further moving the glass upwardly away from the marginal supports into molding relation under pressure against the upper molding surface, moving the lower molding surface downwardly and thereby depositing the molded sheet glass substantially in its original marginally supported position.

8. A method of shaping heated sheet glass to predetermined curvatures between upper and lower convex and concave molding surfaces, the steps which comprise supporting heat softened sheet glass substantially horizontally about marginal portions thereof and applying heat until the glass sags to predetermined compound curvature corresponding generally to the curvature of the convex and concave molding surfaces, moving the lower molding surface upwardly into contact with the lower side of the sheet glass at a location inwardly of the marginally supported portions thereof, and further moving the glass upwardly on the lower molding surface away from the marginal supports into molding relation under pressure against the upper molding surface to complete the molding operation between said surfaces, and moving the lower molding surface downwardly and thereby depositing the molded sheet glass substantially in its original marginally supported position.

9. In a method of treating sheet glass, the steps which comprise marginally supporting the sheet glass substantially about its entire perimeter and in a substantially horizontal plane, heating the sheet glass to softening temperature and then moving it horizontally while in softened condition into registering relation to upper and lower convex and concave mold sections, moving the lower mold section upwardly into contact with the lower side of the glass over an area inwardly of the marginally supported area, further moving the glass by the upwardly moving lower mold section into pressure-molding relation to the upper mold section until the glass becomes molded and set between said mold sections, then moving the lower mold section downwardly with the glass thereon until the molded glass is deposited in its original supported position about its marginal edges, and moving the marginally supported molded sheet glass away from the position of registering relation with the upper and lower mold sections.

10. In a method of treating sheet glass, the steps which comprise marginally supporting the sheet glass substantially about its entire perimeter and in a substantially horizontal plane, heating the sheet glass to softening temperature until the glass sags to partially shaped condition, then moving the partially shaped glass horizontally while in softened condition into registering relation to upper and lower convex and concave mold sections, moving the lower mold section upwardly into contact with the lower side of the glass over an area inwardly of the marginally supported area, further moving the glass by the upwardly moving lower mold section into pressure molding relation to the upper mold section until the glass becomes completely molded and set between said mold sections, then moving the lower mold section downwardly with the glass thereon until the molded glass is deposited in its original supported position about its marginal edges, and moving the marginally supported molded sheet glass away from the position of registering relation with the upper and lower mold sections.

LLOYD V. BLACK.

REFERENCES CITED

The following references are of record in the file of this patent:

UNITED STATES PATENTS

| Number | Name | Date |
|---|---|---|
| 1,889,881 | Thompson | Dec. 6, 1932 |
| 2,131,873 | Goodwillie | Oct. 4, 1938 |
| 2,229,613 | Strauch | Jan. 21, 1941 |
| 2,395,727 | Devol | Feb. 26, 1946 |

FOREIGN PATENTS

| Number | Country | Date |
|---|---|---|
| 1,599 | Great Britain | Dec. 18, 1902 |